L. BRANDENBURG.
CLUTCH DRIVE FOR MOTOR WHEELS.
APPLICATION FILED SEPT. 5, 1911.

1,064,047.

Patented June 10, 1913.

2 SHEETS—SHEET 1.

WITNESSES:
Roy E. Finger.
R. E. Randle.

Lewis Brandenburg,
INVENTOR;
By Robert W. Randle,
ATTORNEY.

L. BRANDENBURG.
CLUTCH DRIVE FOR MOTOR WHEELS.
APPLICATION FILED SEPT. 5, 1911.

1,064,047.

Patented June 10, 1913.

2 SHEETS—SHEET 2.

WITNESSES
Ray E. Fryar
R. E. Randle

Lewis Brandenburg,
INVENTOR;
By Robert W. Randle,
ATTORNEY.

UNITED STATES PATENT OFFICE.

LEWIS BRANDENBURG, OF PORTLAND, INDIANA.

CLUTCH-DRIVE FOR MOTOR-WHEELS.

1,064,047.  Specification of Letters Patent.  Patented June 10, 1913.

Application filed September 5, 1911. Serial No. 647,607.

*To all whom it may concern:*

Be it known that I, LEWIS BRANDENBURG, a citizen of the United States, residing in the city of Portland, in the county of Jay and State of Indiana, have invented a new and useful Clutch-Drive for Motor-Wheels, of which the following is a full, clear, and comprehensive exposition and specification, being such as will enable others to make and use the same with absolute exactitude.

The object of my present invention, broadly speaking, is to provide a clutch-drive, for motor vehicle wheels, or the like, which will be strong and durable in construction, neat and attractive in appearance, highly efficient in operation, economical in practice, and which may be manufactured and sold at a comparatively low price.

A more particular object is to provide a clutch construction between the sprocket or brake-drum and the wheel, whereby the wheel may be easily and quickly removed without disturbing the sprocket or the brake-drum, and at the same time providing a flexible connection between the sprocket and driven wheel, and to obtain other desiderata which will be brought out in the course of the following specification, and that which is new will be correlated in the appended claims.

The primal feature is the peculiarly applied clutch for transmitting motion from the sprocket or drive to the wheel to be driven.

One manner for the accomplishment of my invention in a practical manner, and that which in practice I have found to be the most advantageous and efficient, is shown in the accompanying two sheets of drawings, in which—

Figure 1:
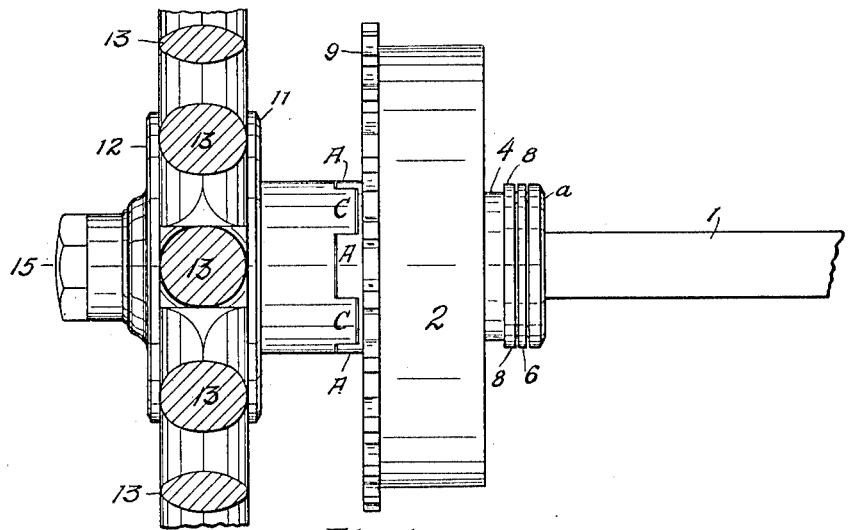
Figure 2:
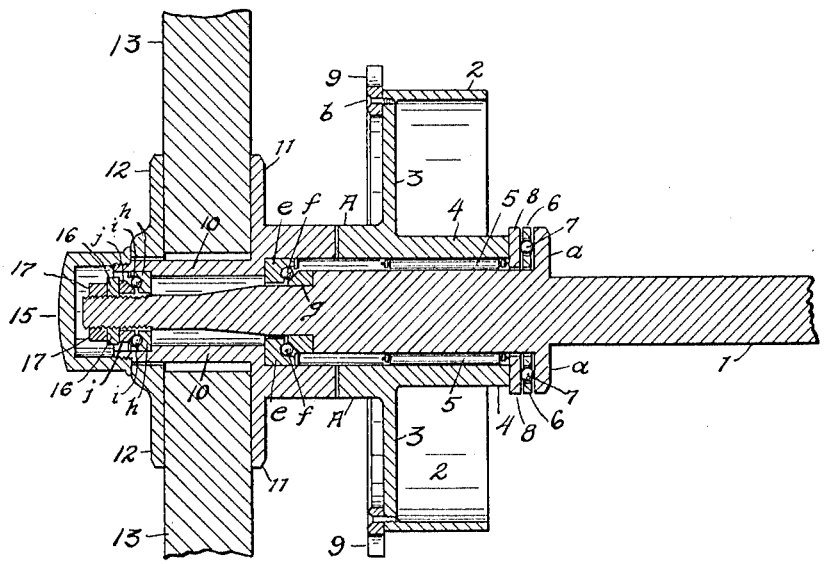
Figure 3:
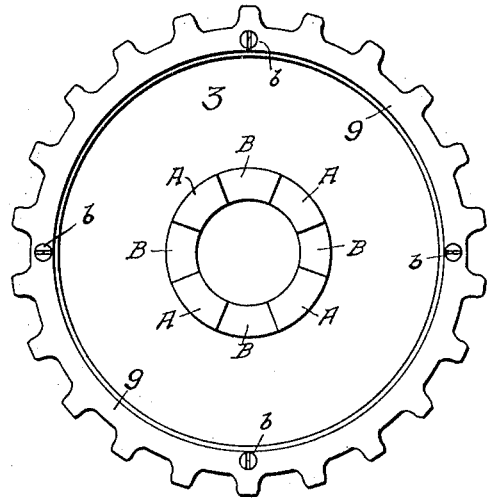
Figure 4:
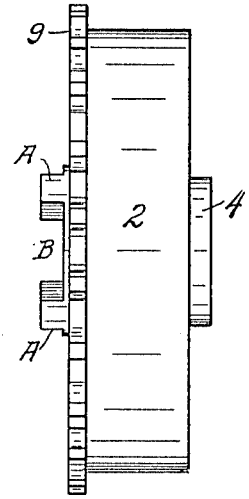
Figure 5:
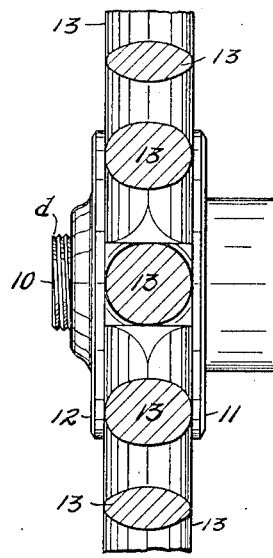
Figure 6:
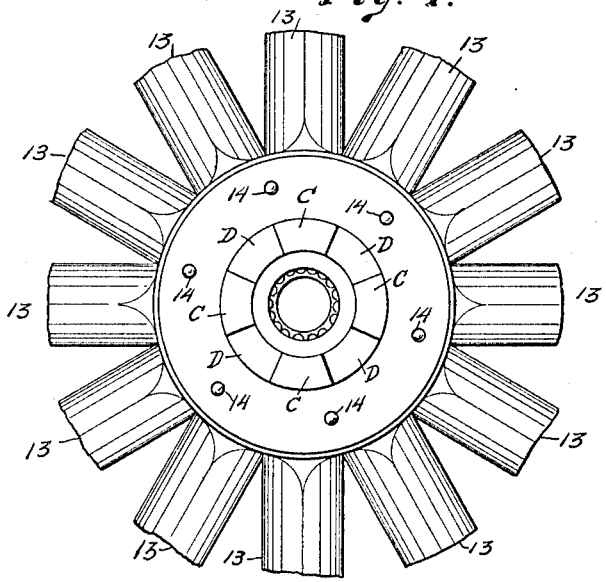
Figure 7:
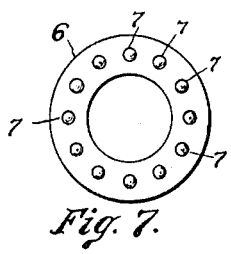

Figure 1 shows my invention complete and in elevation, and in operative position. Fig. 2 is a central longitudinal section as taken through the parts shown in Fig. 1. Fig. 3 is an inside face view of one member of the clutch, showing the sprocket and a portion of the brake-drum. Fig. 4 is an edge elevation of the parts shown in Fig. 3. Fig. 5 is an edge view or elevation of the wheel, showing the other member of the clutch. Fig. 6 is an inside face elevation of the parts shown in Fig. 5. And Fig. 7 is a plan detail view of the ball-bearing for the end-thrust.

Similar indices denote like parts throughout the several views.

In order that the construction and the operation of my invention may be more easily understood, and that its several advantages may be properly noticed and appreciated, I will now take up a detail description thereof, in which I will describe the invention as briefly and as comprehensively as I may.

In the drawings numeral 1 denotes the usual shaft, which is relatively stationary. Formed around on or integral with the shaft is a flange $a$ whose contact face, at least, is at right angles to the longitudinal direction of the shaft. The outer portion of said shaft is reduced in diameter, and the extreme outer end is threaded for the purposes hereinafter stated.

The brake drum mechanism is composed of the brake-drum 2, which has the web 3, and the hub 4, all of which may be formed integral with each other. Disposed around between the central bore of the hub 4 and the shaft 1 is the roller-bearings 5 which separate the hub 4 from the shaft 1.

Numeral 6 denotes a ball-bearing ring which carries a plurality of balls 7, the latter being adapted to contact with the face of said flange $a$. The diameter of said ring 6 is the same as that of the flange $a$.

Numeral 8 denotes a loose ring which is of the same size as the ball-bearing ring 6, and both are allowed to revolve around on the shaft 1. The flange $a$, the ball-bearing ring 6, the balls 7, and the ring 8, form an end-thrust frictionless bearing, whose utility will be apparent. The inner end of the hub 4 is adapted to impinge or rest against the ring 8, as indicated, when the invention is in operative position.

Numeral 9 denotes the sprocket-ring, which is secured, by the screws or bolts $b$, to one side of the drum 2 and the flange 3, substantially as shown. The diameter of the sprocket 9 is greater than that of the drum 2, whereby the sprocket projects out beyond the drum, as shown, but it is concentric therewith.

Extending outward from the hub 4 and the flange 3, is the minor member of the clutch,—which consists of a plurality of lugs A, alternating with an equal number of sockets B, the lugs and the sockets being formed of substantially the same dimensions, the lugs being infinitesimally smaller than are the sockets.

The wheel hub comprises the body portion 10 which surrounds the shaft 1 but is not in direct contact therewith. The periphery of the outer end of member 10 is threaded, as indicated by the threads $d$. Extending out from around the inner end of the body 10 is the permanent flange 11 which is formed integral with member 10.

Numeral 12 denotes the removable flange, which is adapted to fit around and slide on the body 10 as indicated.

The wheel hub, comprising the parts just stated, is frictionlessly and removably mounted on the shaft by two sets of roller bearings: The inner set of said bearings comprises the ring $e$, which is mounted in a groove therefor formed around in the inner periphery of the wheel hub 10, and which carries a plurality of balls $f$; and the bevel-faced ring $g$, which is located in a groove formed in the periphery of the axle 1, and on the face of which said balls $f$ are adapted to travel. The outer bearing referred to comprises a ring $h$ which is mounted in a groove formed in the outer portion of the inner periphery of the wheel hub, and which carries a plurality of balls $i$, and the loose cone $j$ which is adapted to slip on over the threaded end portion of the shaft 1.

Extending inward from the wheel-hub is the major clutch member, which is of the same size as is the minor clutch member above referred to. The major clutch member consists of a plurality of lugs C, alternating with an equal number of sockets D, the lugs and the sockets being formed of substantially the same dimensions, except that the lugs should be infinitesimally smaller than are the sockets.

It should be noted that the lugs C are of the same size as are the lugs A, and that the sockets D are of the same size as are the sockets B.

Numeral 13 denotes the spokes whose inner ends fill the space between the flanges 11 and 12, and radiate therefrom, with their outer ends connected with the wheel rim (not shown), thereby completing the wheel. The flanges or disks 11 and 12 are to be clamped on the inner ends of the spokes by means of the bolts or screws 14.

Numeral 15 denotes a cap which is adapted to be screwed on the threads $d$, thereby covering the end of the axle and preventing dirt from getting in to the bearings. The cone $j$ is retained in place by the nut 16, and it in turn is prevented from turning by means of the lock-nut 17.

As heretofore intimated, the prime feature of this invention is the separable clutch, through which motion or power is transmitted from the sprocket to the wheel, therefore by reason of the importance of the clutch, as relates to this invention, the details thereof should be clearly comprehended: The face of each clutch-member comprises a plurality of trapezium-shaped lugs, having square shoulders, alternating with sockets or notches of substantially the same size and shape as are the said lugs, the lugs and the sockets of each clutch-member being arranged in a circle around a common point; and the lugs of one clutch-member are adapted to engage in the sockets or notches of the other clutch-member.

From the above it is apparent that when the parts are assembled, as in Figs. 1 and 2, that the members of the clutch engage with each other in such manner that for practical operative purposes the sprocket and brake-drum, and the wheel are practically integral with each other, without the disadvantages of being integral however, it manifestly being impossible to revolve one without revolving the other. Should it be desired, however, to remove the wheel then one has only to unscrew and remove the cap 15, then the lock-nut 17, and then the nut 16, after which the cone $j$ may be removed, and then the entire wheel proper may be removed, parting the members of the clutch, and allowing the brake-drum and the sprocket to remain in their original and operative positions.

This construction has several distinct advantages: It allows the wheel proper to be removed for repair, or otherwise, without the necessity of removing the brake-drum and sprocket, thereby making the wheel lighter to handle and reducing the expense of transportation; in case of the breakage it does not involve other parts, as for instance if the brake-drum become broken it may be repaired or replaced without involving the wheel proper; the repair of the wheel can be accomplished for less than heretofore; the ball-bearing end thrust will reduce the wear and will cause the mechanism to operate more easily than heretofore and with less depreciation; and, finally, this construction allows a certain amount of flexibility between the sprocket and the wheel which has not heretofore been obtained.

The various features and advantages involved in this construction and the operation of my invention have been stated as clearly and as simply as possible, in order that the involved invention may be readily comprehended by the amateur as well as by the expert mechanician.

I also would have it understood that various changes may be made in the several details of construction, from that herein shown and described, without departing from the spirit of my invention or sacrificing any of the advantages thereof.

Having now fully shown and described my invention, and the best exemplification thereof to me known at this time, what I claim, and desire to secure by Letters Patent of the United States, is—

1. In a clutch drive for motor vehicles, the combination with a non-rotatable axle having a spindle end and a flange spaced inwardly from said spindle end; of a drum rotatably mounted on the axle inwardly of the spindle end, said drum having a hub portion provided with an outwardly extending flange having clutch teeth, antifriction means between said hub and the axle and between the hub and the flange, a wheel journaled on the spindle spaced from the drum and having a reduced inwardly extending portion provided with clutch teeth to coöperate with the clutch teeth of the hub flange, means on the spindle to limit the inward displacement of the wheel independent of the drum and means for simultaneously holding the wheel and bearings from outward displacement.

2. A clutch drive for motor vehicles embracing the combination with an axle thereof having a reduced outer end and an integral flange inwardly of and spaced from said reduced portion; of a drive sprocket rotatably mounted on the axle inwardly of the reduced portion and having a clutch head projecting outwardly, anti-friction means between said sprocket and flange and including a loose collar, a plate between said collar and flange and having a plurality of apertures and balls mounted in said apertures, a wheel spaced from said sprocket and having a hub rotatably journaled on the reduced portion of the axle, said hub having a clutch head coacting with the first named clutch head, and including a removable outer plate engaged on the sleeve thereof anti-friction means between the hub and axle, said means being held against inward displacement and means locking the wheel against outward displacement on the bearings said means engaging the sleeve and bearing against the plate.

In testimony whereof I have hereunto subscribed my name to this specification in the presence of subscribing witnesses.

LEWIS BRANDENBURG.

Witnesses:
F. BRINEL,
FERD HELMSTETTER,
R. W. RANDLE.

---

Copies of this patent may be obtained for five cents each, by addressing the "Commissioner of Patents, Washington, D. C."